Figure 1:
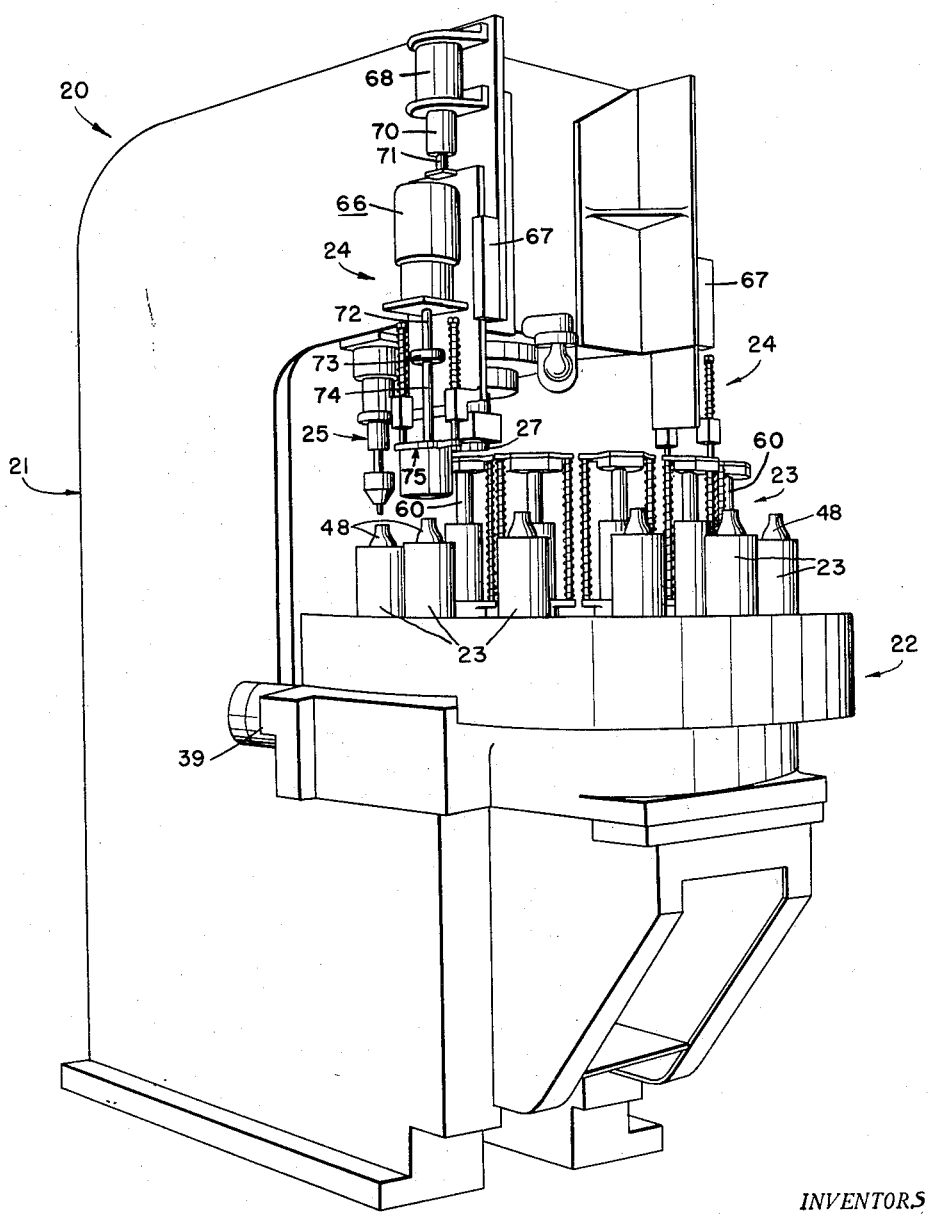

Feb. 10, 1959 H. E. STEIN ET AL 2,873,120
HYDRAULICALLY OPERATED CHUCKING APPARATUS
Original Filed April 29, 1952 2 Sheets-Sheet 2

INVENTORS
HENRY E. STEIN
HENRY V. MOG
JOHN W. STERTZER
BY Donald J. Petrich.
their Agent United States Patent Office 2,873,120
Patented Feb. 10, 1959

2,873,120

HYDRAULICALLY OPERATED CHUCKING APPARATUS

Henry E. Stein, Worthington, and Henry V. Mog and John W. Stertzer, Columbus, Ohio, assignors, by mesne assignments, to American Brake Shoe Company, New York, N. Y., a corporation of Delaware Original application April 29, 1952, Serial No. 284,876, now Patent No. 2,743,604, dated May 1, 1956. Divided and this application June 13, 1955, Serial No. 515,096

13 Claims. (Cl. 279—4)

This invention relates to apparatus for handling or holding objects, such for example as containers, which may be in the form of open-ended rocket bodies which are to be tested hydrostatically.

An object of the invention is to provide improved apparatus of the type set forth above.

Another object of the invention is to provide improved construction in a hydraulically operated chuck for handling objects of the type set forth above.

Another object of the invention is to provide improved testing apparatus for hydrostatically testing containers which includes improved fluid operated chuck means for holding and rotating the container bodies.

Still another object of the invention is to provide improved construction in apparatus for operating upon objects including improved hydraulically operated chucking apparatus for handling the objects and improved fluid circuits for controlling the chucking apparatus.

Further objects and advantages of the present invention will be apparent from the following description, reference being had to the accompanying drawings wherein a preferred form of embodiment of the invention is clearly shown.

Figure 2:
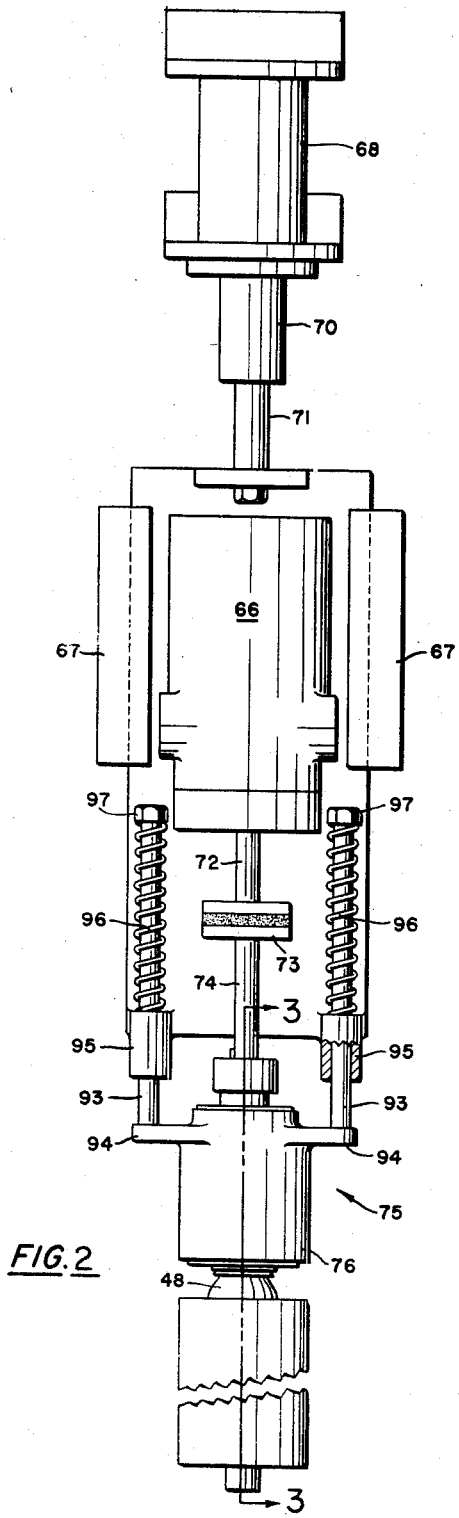
Figure 3:
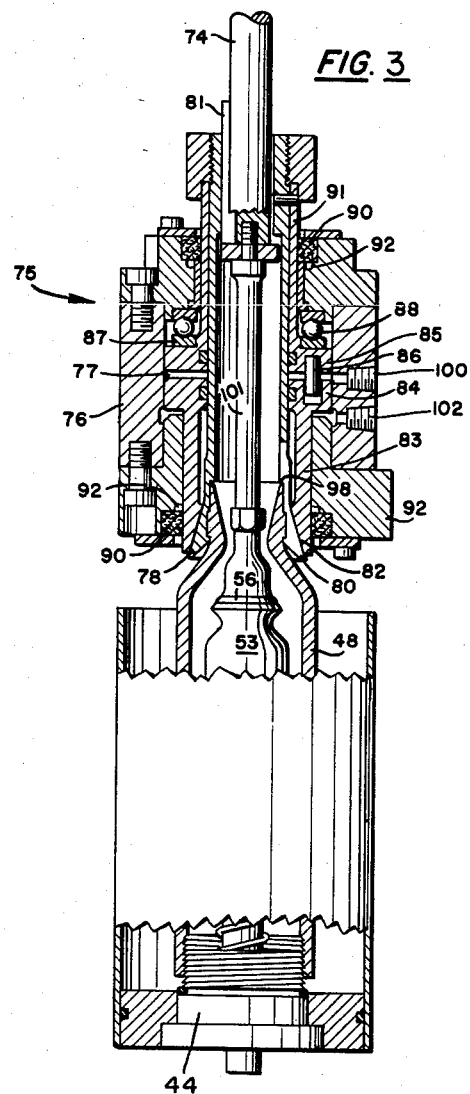

In the drawings:

Fig. 1 is a view in perspective of a testing apparatus including the invention, the apparatus shown being designed particularly for hydrostatically testing open-ended rocket bodies;

Fig. 2 is a front view in elevation of a mechanism employed in the apparatus seen in Fig. 1 to rotate rocket bodies thereby to secure them upon adapters or holders seen in Fig. 6; and Fig. 3 is a view in section, the section being taken substantially on line 3—3 of Fig. 2, and showing in detail the internal construction of hydraulically operated chuck and parts of the rocket body holding mechanism with a rocket body disposed therein.

This application is a division of our co-pending application Serial No. 284,876, filed April 29, 1952, now Patent No. 2,743,604, dated May 1, 1956, for "Apparatus for Hydrostatically Testing Rocket Bodies Or Other Open-Ended Containers." It is to be understood that the construction and operation of the apparatus of this application follows that of our parent application, above identified, and that only subject matter pertinent to an understanding of the present invention is described herein in detail.

Referring to the drawings, numeral 20 in Fig. 1 indicates an apparatus for hydrostatically testing open-ended containers in the form of rocket bodies 48. The machine or apparatus 20 includes a hydraulic press 21 having an index table 22 upon which a plurality of rocket body or container holding and testing apparatuses 23 are provided at spaced stations. The apparatus 20 is also provided with means 24 for engaging and rotating the rocket bodies 48 to be tested thereby to secure them threadedly on and in fluid tight relation with holders or adapters 44 (Fig. 3) which form a part of each of the mechanisms 23. Apparatus 20 is also provided with a filler means 25 for filling the rocket bodies 48 with oil or other testing fluid after the rocket bodies 48 have been mounted in the testing apparatuses 23. In addition the apparatus 20 is provided with means, not shown, for marking the rocket bodies 48 after they have been tested.

The general operation of the apparatus 20 is as follows:

The rocket bodies 48 to be tested are initially manually applied to the adapters or holders 44 (Fig. 3) by a person, here called an operator, when the index table 22 is at rest between intermittent movements thereof. The holder 44 with the rocket body 48 initially applied thereto is then advanced by the index table 22 to the mechanism 24 which automatically connects a rotary motor 66 to the rocket body 48 and rotates the latter to cause it to be secured by threads to the adapter or holder 44 in fluid tight relation therewith. This operation takes place while index table 22 is at rest between steps in the movement thereof.

At the next station, the rocket body 48, which has been previously applied to the adapter or holder 44, is in registration with the filler means 25 which fills the rocket body 48 with oil. Filling mechanism 25 is shown in Fig. 1 of the drawings, and it includes a valve controlled filling nozzle through which testing fluid is introduced into the rocket bodies 48.

At the next station of rest of the index table 22, the holding and testing mechanism 23 registers with the ram 27 in the press 21 and ram 27 is moved to actuate the testing mechanism 23 to apply an intense force on the rocket body 48. When the test has been successfully concluded, the marking mechanism, not shown, is operated to apply a suitable mark to the outside of the rocket body to indicate that the body withstood or passed the test.

At the next station in the movement of the index table 22, the rocket body 48 is engaged by a mechanism similar to mechanism 24 which causes the rocket body 48 to be rotated in a direction to unscrew it from the adapter or holder 44 so that at a subsequent stage in the operation of the index table 22 the rocket body 48 can be removed from the apparatus.

The hydraulic press 21 and index table 22 employed in the apparatus 20 is shown and described in Patent No. 2,512,731 to Cecil E. Adams, dated June 27, 1950, and since, per se, they form no part of the present invention, further description of their construction is omitted. It is sufficient to state that this mechanism operates to cause a cycle including the advance and retraction of the ram 27, then one increment of movement of index table 22 while the ram 27 is in its retracted position. The increment of movement of index table 22 is followed by another advance and retractive movement of the ram 27 and then the index table 22 moves another increment. These operations are continued automatically until the operation of the press is interrupted either manually or by automatic control means not shown here.

As previously mentioned, the index table 22 is provided at spaced stations thereon with the rocket body holding and testing mechanisms 23. Since the holding and testing mechanisms 23, per se, also form no part of the present invention, they are not shown in detail herein. However, each of them does include an adapter or holder 44 (see Fig. 3) for receiving a rocket body 48. The adapter or holder 44 has an upwardly projecting portion which is provided with screw threads formed for the reception of similar screw threads provided in one of the open ends of each rocket body 48. It will be obvious that to test a rocket body 48, it is necessary to apply it securely and in fluid tight relation with the adapter or holder 44. In order to accomplish this attachment in a rapid manner, the mechanism 24 shown in Figs. 2 and 3 of the drawings is employed.

Mechanism 24 includes a fluid motor 66 which is mounted for vertical sliding movement as at 67 on the side of the press frame. The mounting means of fluid motor 66 is connected to an air motor 68 and is reciprocated vertically by the piston 70 and stem 71 thereof. Shaft 72 of fluid motor 66 is connected by a coupling 73 with the shaft 74 of a rotary chucking device 75. Chucking device 75 is employed to connect the rocket body 48 separably to the fluid motor 66 so that rotary movement may be imparted by the motor 66 to the rocket body 48 thereby to thread it onto the adapter or holder 44 of the holding mechanism 23. When the rocket body 48 is applied to the holding mechanism 23, it is initially threaded onto the adapter or holder 44 thereof about one-half turn and, when it is advanced into registration with the mechanism 24, it is connected by the chucking mechanism 75 with the fluid motor 66 and the threading of the rocket body 48 onto the adapter or holder 44 is completed.

The chucking mechanism 75 includes a body or casing 76 which forms a chamber 77 for the reception of the various parts of the chuck. This chuck includes a spring collet 78 having jaws 80 at its lower end for engaging and holding the end of the rocket body 48. The member 78 extends completely through the casing 76 and is keyed at 81 to the shaft 74 so that it will rotate in unison with this shaft. The lower ends of the jaws 80 of the collet flare outwardly at 82 and are engaged with a sleeve-like piston 83 having a tapered surface for engaging the flare 82. Sleeve-like piston 83 is enlarged at its upper end to provide a piston head 84 which is coupled for rotation to a similar piston head 85 by one or more pins 86. Piston head 85 is provided with one race 87 of an anti-friction bearing 88, the other race of which is carried by the casing or body 76. Body or casing 76 is provided at its opposite ends with seals 90 which prevent the escape of fluid around the sleeve portion of piston 83 and the sleeve portion 91 of a second sleeve-like piston including the piston head 85. Suitable grooves 92 are provided in the body 76 adjacent two seals 90, these grooves 92 being connected with a drain passage so that the seals 90 will not be subjected to excessive pressure.

It will be obvious from the foregoing description that, when shaft 74 is revolved, the collet 78 and the pistons including sleeves 83 and 91 and heads 84 and 85, respectively, will be revolved. The chucking mechanism 75 is resiliently suspended by a pair of guide rods 93 connected to ears 94 on the body or casing 76. Rods 93 extend through lugs 95 formed on the mounting means for the fluid motor 66. Coiled compression springs 96 surround rods 93 and are disposed between the lugs 95 and heads 97 on rods 93. Springs 96 resiliently support the chucking mechanism 75 and permit relative movement between the chucking mechanism 75 and the fluid motor 66 when the chucking mechanism 75 engages a rocket body 48.

Fig. 3 shows a rocket body 48 operatively positioned in the chucking mechanism 75. The upper end of this rocket body 48 engages a shoulder 98 formed in the collet 78, thus limiting the distance the rocket body 48 will move into it. After the rocket body 48 has been so positioned, hydraulic fluid under pressure is introduced through a port 100 to a chamber or space between the piston heads 84 and 85. This fluid under pressure will urge piston head 84 in a downward direction causing sleeve 83 to move downward relative to the collet 78. Collet 78 is held in its uppermost position by the fluid pressure applied to the head 85. As the sleeve 83 moves downwardly, the tapered opening at its lower end co-operates with the flared portion 82 of the collet 78 causing the jaws 80 of the collet 78 to grip the upper portion or neck of the rocket body 48. When the rocket body 48 is so gripped, it will be rigidly connected with the fluid motor 66 and rotary movement imparted to the motor shaft 72 will cause similar movement of the rocket body 48.

To prevent an annular gasket 56 on a non-rotatable stopper member 53 of the test mechanism 23 from being worn or prematurely destroyed during the rotary movement of the rocket body 48, the shaft 74 is provided with an extension 101 which projects through the collet 78 and engages the upper end of the member 53 on the holder. Member 53 is spring pressed in an upward direction and, when it is engaged by the extension 101, it is depressed until the gasket 56 is removed from engagement with the inner wall of the rocket body 48. After the rocket body 48 has been firmly secured to the adapter or holder 44, further rotation of the rocket body 48 will be precluded. To release the collet jaws 80 from the rocket body 48, fluid under pressure is supplied to port 102 and port 100 is connected with exhaust. Fluid under pressure from port 102 is applied to the underside of piston head 84 causing it to move upwardly thereby permitting the collet jaws 80 to expand and release their grip on the rocket body 48. At this time also air cylinder 68 will be operated to elevate the chucking mechanism 75 above the rocket body 48 so that the body 48 may be indexed by table 22 to the next station where the rocket body 48 will be filled with testing fluid.

When the rocket body 48 has been filled with testing fluid, the index table 22 moves it into the testing position adjacent the press ram 27 where a plunger 60 (see Fig. 1) of the testing mechanism 23 will be aligned with the press ram 27 and, when the ram 27 is advanced, plunger 60 will be moved to cause the hydrostatic pressure within the rocket body 48 to increase. After the rocket body 48 has been subjected to the hydrostatic test for a predetermined length of time and has successfully withstood such test, the body will be marked by the marking mechanism which is not shown.

After the rocket body 48 is marked and the ram 27 is retracted, the index table 22 is operated to move the holding and testing mechanism 23 to a succeeding station where a mechanism 24 identical to that shown in Fig. 2 is provided. In this second mechanism 24 the fluid motor 66 operates in a reverse direction. The chucking mechanism of this second mechanism 24 operates to connect the rocket body 48 to the second fluid motor 66 so that reverse rotation of the shaft of this member causes similar movement of the rocket body 48 to unthread it from the adapter or holder 44. The unthreading operation is interrupted just prior to the separation of the rocket body from the adapter or holder and the operation is completed manually when the rocket body is removed from the testing apparatus 23.

All of the various mechanisms which cooperate to make up the apparatus 20 are tied together electrically to make the operation of the apparatus 20 completely automatic after the rocket bodies 48 are applied to the holders 23. Reference may be made to Patent 2,743,604, of which this application is a division, for a complete understanding of the electrical and hydraulic circuits and devices of the apparatus as well as other details thereof which are not described herein.

While the form of embodiment of the present invention as herein disclosed constitutes a preferred form, it is to be understood that other forms might be adopted, all coming within the scope of the claims which follow.

We claim:

1. In a machine for handling articles, a chuck means for gripping and revolving an article, said chuck means including a body; means for mounting said body against rotation; article engaging jaws supported for rotary movement relative to said body; fluid pressure responsive means disposed in said body for rotary and axial movement with respect thereto and for axial movement with respect to said jaws to cause movement of the latter relative to one another to grip an article, and motor means for imparting rotary movement to said fluid pressure responsive means and said jaws.

2. In a machine for handling articles, chuck means for gripping and revolving an article, said chuck means including a body forming a piston chamber; article engaging jaws supported in said body for rotary movement relative thereto, said jaws being movable relative to one another to grip and release articles; piston means disposed for axial and rotary movement in said chamber to impart movement to said jaws relative to one another; means for conducting fluid to said chamber for moving said piston means, and means for simultaneously rotating said jaws and piston means with respect to said body.

3. In a machine for handling articles, a chuck means for gripping and revolving an article, said chuck means including a body forming a piston chamber; a collet with relatively movable jaws journalled for rotary movement in said body; a pair of piston means in said piston chamber; means rigidly connecting one of said piston means to said collet; the other of said piston means being disposed for axial and rotary movement in said piston chamber and formed to co-operate in imparting movement to said jaws, and means for rotating said first piston means and said collet.

4. In a machine for handling articles, a chuck means for gripping and revolving an article, said chuck means including a body forming a piston chamber; a collet with relatively movable jaws journalled for rotary movement in said body; a pair of piston means in said piston chamber; means rigidily connecting one of said piston means to said collet; the other of said piston means being disposed for axial and rotary movement in said piston chamber; interengaging means on said collet and said second piston means operative upon movement of the latter to impart movement to said jaws, and means for rotating said first piston and said collet.

5. In a machine for handling articles including chuck means for gripping and revolving the articles, a support forming guide means; a member mounted for movement in said guide means; chuck means including a body carried by said member, said body forming a piston chamber; a collet with relatively movable jaws journalled for rotary movement in said body; a pair of piston means in said piston chamber; means rigidly connecting one of said piston means to said collet, the other of said piston means being disposed for axial and rotary movement in said piston chamber and formed to co-operate in imparting movement to said jaws; motor means connected to rotate said first piston means and said collet, and means for moving said member to advance said chuck means toward an article and retract it therefrom.

6. In a machine for handling articles, a hydraulic chuck means for gripping and rotating an article, said chuck means including a body; means forming a piston chamber in said body; a pair of pistons in said chambers; collet means extending axially through said pistons; means rigidly connecting said collet means and one of said pistons; anti-fritcion thrust bearing means between said one piston and said body; means connecting the other of said pistons to rotate with and slide along said collet; means moved by said other piston for operating said collet to cause the latter to grip an article; conduit means for conducting fluid selectively to opposite sides of said other piston for moving it in opposite directions to operate said collet means as aforesaid, said conduit means leading to said chamber through said cylinder means; motor means for moving said chuck means as a unit, and motor means for rotating said collet and pistons as a unit with respect to said body.

7. Hydraulic chuck means for gripping and rotating an article, said chuck means including a body; means forming a piston chamber in said body; a pair of pistons in said chamber; collet means extending axially through said pistons; means rigidly connecting said collet means and one of said pistons; anti-friction thrust bearing means between said one piston and said body; means connecting the other of said pistons to rotate with and slide along said collet; means moved by said other piston for operating said collet to cause the latter to grip an article; conduit means for conducting fluid selectively to opposite sides of said other piston for moving it in opposite directions to operate said collet means as aforesaid, said conduit means leading to said chamber through said cylinder means; said collet and pistons being rotatable in unison with respect to said body.

8. Hydraulic chuck means for gripping and revolving an article, said chuck means including a body; piston chamber forming means within said body; collet means supported for rotary movement with respect to said body and on the axis of said piston chamber, said collet means including jaws movable with respect to each other for gripping articles; means for preventing relative axial movement between said collet means and said body including an anti-friction bearing; piston means within said chamber means and surrounding said collet means; means connecting said piston means to rotate with said collet means; means moved by said piston means for causing said collet means to grip an article, and means forming conduits for fluid leading through said body into said piston chamber means and at opposite sides of said piston means whereby fluid pressure may be applied selectively to opposite sides of said piston means to cause the latter to operate said collet means.

9. Hydraulic chuck means for gripping and revolving an article, said chuck means including a body; piston chamber forming means within said body; collet means supported for rotary movement with respect to said body, said collet means including jaws movable with respect to each other for gripping articles; means for preventing relative axial movement between said collet means and said body; piston means within said chamber means; means connecting said piston means to rotate with said collet means; means moved by said piston means for causing said collet means to grip an article, and means forming conduits for fluid leading through said body into said piston chamber means and at opposite sides of said piston means whereby fluid pressure may be applied selectively to opposite sides of said piston means to cause the latter to operate said collet means.

10. Hydraulic chuck means for gripping and revolving an article, said chuck means including a body; piston chamber forming means within said body; collet means supported for rotary movement with respect to said body and on the axis of said piston chamber, said collet means including jaws movable with respect to each other for gripping articles; means for preventing relative axial movement between said collet means and said body including an anti-friction bearing; piston means within said chamber means and surrounding said collet means; means connecting said piston means to rotate with said collet means; means moved by said piston means for causing said collet means to grip an article, and means forming a conduit for fluid leading through said body into said piston chamber means whereby fluid pressure may be applied to said piston means to cause the latter to operate said collet means.

11. Hydraulic chuck means for gripping and revolving an article, said chuck means including a body; piston chamber forming means within said body; collet means supported for rotary movement with respect to said body, said collet means including jaws movable with respect to each other for gripping articles; means for preventing relative axial movement between said collet means and said body; piston means within said chamber means; means connecting said piston means to rotate with said collet means; means moved by said piston means for causing said collet means to grip an article, and means forming a conduit for fluid leading through said body into said piston chamber means whereby fluid pressure may be applied to said piston means to cause the latter to operate said collet means.

12. In a machine for handling articles, a hydraulic chuck means for gripping and revolving an article, said chuck means including a body; piston chamber forming means within said body; collet means supported for rotary movement with respect to said body, said collet means including jaws movable with respect to each other for gripping articles; means for preventing relative axial movement between said collet means and said body; piston means within said chamber means; means connecting said piston means to rotate with said collet means; means moved by said piston means for causing said collet means to grip an article, means forming a conduit for fluid leading through said body into said piston chamber means whereby fluid pressure may be applied to said piston means to cause the latter to operate said collet means; motor means for moving said chuck means as a unit, and motor means for rotating said collet and piston means as a unit with respect to said body.

13. In a machine for handling articles, a hydraulic chuck means for gripping and revolving an article, said chuck means including a body; piston chamber forming means within said body; collet means supported for rotary movement with respect to said body, said collet means including jaws movable with respect to each other for gripping articles; means for preventing relative axial movement between said collet means and said body; piston means within said chamber means; means connecting said piston means to rotate with said collet means; means moved by said piston means for causing said collet means to grip an article, means forming a conduit for fluid leading through said body into said piston chamber means whereby fluid pressure may be applied to said piston means to cause the latter to operate said collet means, and motor means for rotating said collet and piston means as a unit with respect to said body.

References Cited in the file of this patent

UNITED STATES PATENTS

| | | |
|---|---|---|
| 1,249,025 | Carvalho | Dec. 4, 1917 |
| 1,734,529 | Pennock | Nov. 5, 1929 |
| 2,106,365 | Tiano | Jan. 25, 1938 |
| 2,381,657 | Eksergian et al. | Aug. 7, 1945 |
| 2,418,082 | Marasko | Mar. 25, 1947 |
| 2,507,127 | True | May 9, 1950 |
| 2,639,822 | Sax et al. | May 26, 1953 |
| 2,655,384 | Peterson | Oct. 13, 1953 |
| 2,743,604 | Stein et al. | May 1, 1956 |